US007826491B2

(12) United States Patent
Currivan

(10) Patent No.: US 7,826,491 B2
(45) Date of Patent: *Nov. 2, 2010

(54) SYNCHRONIZATION OF DISTRIBUTED CABLE MODEM NETWORK COMPONENTS

(75) Inventor: Bruce J. Currivan, Dove Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 11/216,549

(22) Filed: Aug. 31, 2005

(65) Prior Publication Data

US 2006/0056323 A1 Mar. 16, 2006

Related U.S. Application Data

(63) Continuation-in-part of application No. 11/031,568, filed on Jan. 6, 2005, and a continuation-in-part of application No. 11/061,147, filed on Feb. 18, 2005.

(60) Provisional application No. 60/609,663, filed on Sep. 14, 2004, provisional application No. 60/629,781, filed on Nov. 20, 2004, provisional application No. 60/635,531, filed on Dec. 11, 2004.

(51) Int. Cl.
*H04J 3/26* (2006.01)
*H04J 3/07* (2006.01)

(52) U.S. Cl. ........................ 370/505; 370/432; 370/420

(58) Field of Classification Search ................. 370/503, 370/504, 505, 509, 510, 278, 506–508, 432, 370/420; 375/362–366, 376, 375, 294; 713/400, 713/500–503; 725/119
See application file for complete search history.

(56) References Cited

U.S. PATENT DOCUMENTS

| | | | | |
|---|---|---|---|---|
| 6,353,604 | B2 * | 3/2002 | Grimwood et al. | 370/335 |
| 6,501,809 | B1 * | 12/2002 | Monk et al. | 375/363 |
| 6,594,305 | B1 * | 7/2003 | Roeck et al. | 375/222 |
| 2001/0033611 | A1 | 10/2001 | Grimwood et al. | |
| 2001/0038647 | A1 * | 11/2001 | Bernath et al. | 370/503 |
| 2002/0129378 | A1 | 9/2002 | Cloonan et al. | |
| 2003/0156603 | A1 * | 8/2003 | Rakib et al. | 370/485 |
| 2004/0095963 | A1 | 5/2004 | Rakib | |
| 2004/0120443 | A1 * | 6/2004 | Lee et al. | 375/376 |

(Continued)

FOREIGN PATENT DOCUMENTS

WO WO 01/19005 A1 3/2001

*Primary Examiner*—Ian N Moore
(74) *Attorney, Agent, or Firm*—Garlick Harrison & Markison; Bruce E. Garlick; Shayne X. Short

(57) ABSTRACT

A distributed Cable Modem Termination System (CMTS) includes a head end, a downstream transmitter hub, and a plurality of cable modems that all establish frequency lock with a common frequency reference. The head end transmits a plurality of time stamps from the head end to the plurality of cable modems via a packet data network, the downstream transmitter hub, and cable modem network plant. Each of the plurality of cable modems performs smoothing operations on the plurality of time stamps to establish phase lock with the head end. The downstream transmitter and the plurality of cable modems perform ranging operations to establish phase lock among the plurality of cable modems. In an alternate operation, the frequency reference includes marker sequences that the devices of the distributed CMTS use to establish phase lock.

22 Claims, 13 Drawing Sheets

U.S. PATENT DOCUMENTS

| | | | | |
|---|---|---|---|---|
| 2004/0163120 | A1 | 8/2004 | Rabenko et al. | |
| 2006/0056461 | A1* | 3/2006 | Currivan et al. | 370/503 |
| 2007/0195824 | A9* | 8/2007 | Chapman et al. | 370/490 |

* cited by examiner

1000

SYNCHRONIZATION OF DISTRIBUTED CABLE MODEM NETWORK COMPONENTS

CROSS REFERENCES TO RELATED APPLICATIONS

This application is a continuation-in-part of U.S. Utility application Ser. No. 11/031,568, filed Jan. 6, 2005 and is a continuation-in-part of U.S. Utility application Ser. No. 11/061,147, filed Feb. 18, 2005, both of which claim priority to U.S. Provisional Patent Application Ser. No. 60/609,663, filed Sep. 14, 2004, to U.S. Provisional Patent Application Ser. No. 60/629,781, filed Nov. 20, 2004, and to U.S. Provisional Patent Application Ser. No. 60/635,531, filed Dec. 11, 2004, all of which are incorporated herein by reference for all purposes.

BACKGROUND OF THE INVENTION

1. Field of the Invention

The invention relates generally to communication systems and, more particularly, it relates to cable modem communication systems.

2. Description of Related Art

Conventional cable modem communication systems include Cable Modem Termination Systems (CMTSs), serviced Cable Modems (CMs), and a cable modem network plant, i.e., hybrid fiber-coaxial media that communicatively couples these devices. The CMTS services data communications for the CMs via downstream transmissions from the CMTS to the CMs and upstream transmissions from the CMs to the CMTS. The Data Over Cable Service Interface Specification (DOCSIS) typically governs the transmission and receipt of signals of the cable modem communication system. In its various forms, DOCSIS supports Time Division Multiple Access (TDMA), Frequency Division Multiple Access (FDMA), and Code Division Multiple Access (CDMA) operations. Ranging and registering operations are performed to manage the timing of communications between the CMTS and the CMs.

The structure of CM communications systems continues to evolve. One evolution of the structure of cable modem communication systems includes distributing the CMTS across differing devices that intercouple via a packet data network. Operation of the CM communication system requires synchronization of the distributed CMTS components. Because the packet data network introduces significant jitter, it would likely be impractical to use the packet data network to meet the accuracy required for synchronization of CMTS components without adding excessive latency. Thus, a need exists for synchronizing the distributed CMTS components while meeting all system requirements.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
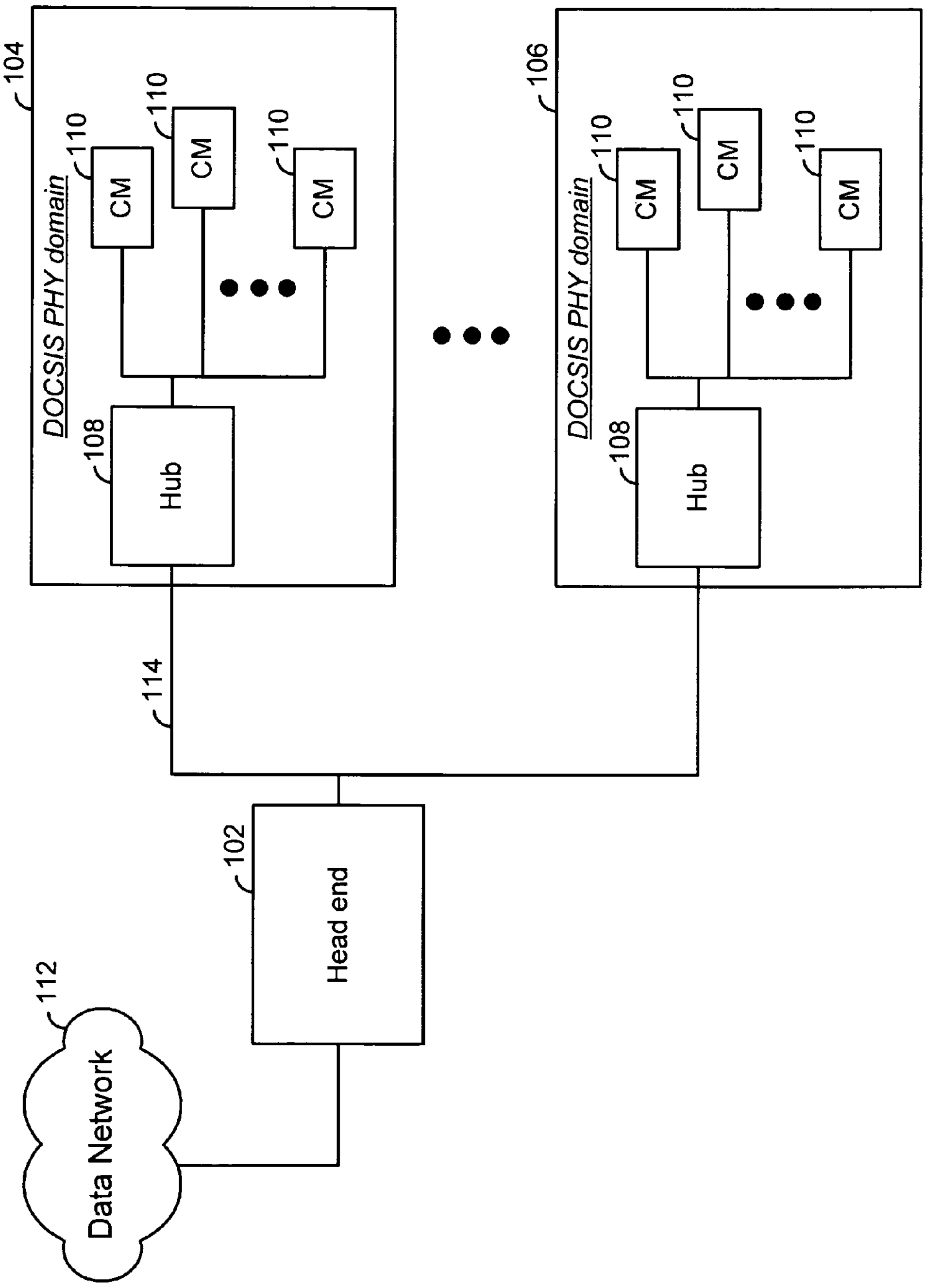
FIG. 1 is a system diagram illustrating a cable modem communication system having distributed Cable Modem Termination System (CMTS) head end components.

FIG. 1 is a system diagram illustrating a cable modem communication system having distributed Cable Modem Termination System (CMTS) head end components. As is illustrated in FIG. 1, the distributed CMTS includes a head end 102 and distributed hubs 108. Each of the distributed hubs 108 services a respective Data Over Cable System Interface Specification (DOCSIS) Physical Layer (PHY) domain 104 and 106. Each DOCSIS PHY domain 104 and 106 services a plurality of cable modems (CMs) 110. The head end 102 couples to the hubs 108 via a media 114. The head end 102 transfers data to, and receives data from the cable modems 100 via the hubs 108 and the media 114.

Synchronization of transmissions within the PHY domains 104 and 106 is a requirement. When supporting TDMA operations, burst transmissions (both upstream and downstream) within each DOCSIS PHY domain 104 and 106 must be sent at accurate times (100 ns level) to avoid collision.

When operating in the DOCSIS 2.0 S-CDMA mode, timing is even more critical because synchronization to the symbol level is required. Thus, a more stringent synchronization on the order of 1 ns is required. In order to meet these timing requirements, the head end 102 could maintain a reference clock, e.g., operating at 10.24 MHz. The hubs 108 could then lock their clocks to the reference clock of the head end 102 via link 114. Each CM 110 could then lock its clock to the downstream symbol clock, which is synchronized to the 10.24 MHz reference clock. Ranging operations could then be employed to adjust the offsets of the clocks of the CMs 110 to within 1 ns, typically. Once ranged, a CM 110 should not drift off in time, due to the closed-loop synchronous aspects of the system. However, to allow for changes in the cable modem network plant propagation delay as temperature, wind and other factors that vary over time, ranging is repeated every 30 seconds, or more often, for each CM 110. With this synchronization enacted, the entire DOCSIS PHY 104 and/or 108 are synchronous.

Figure 2:
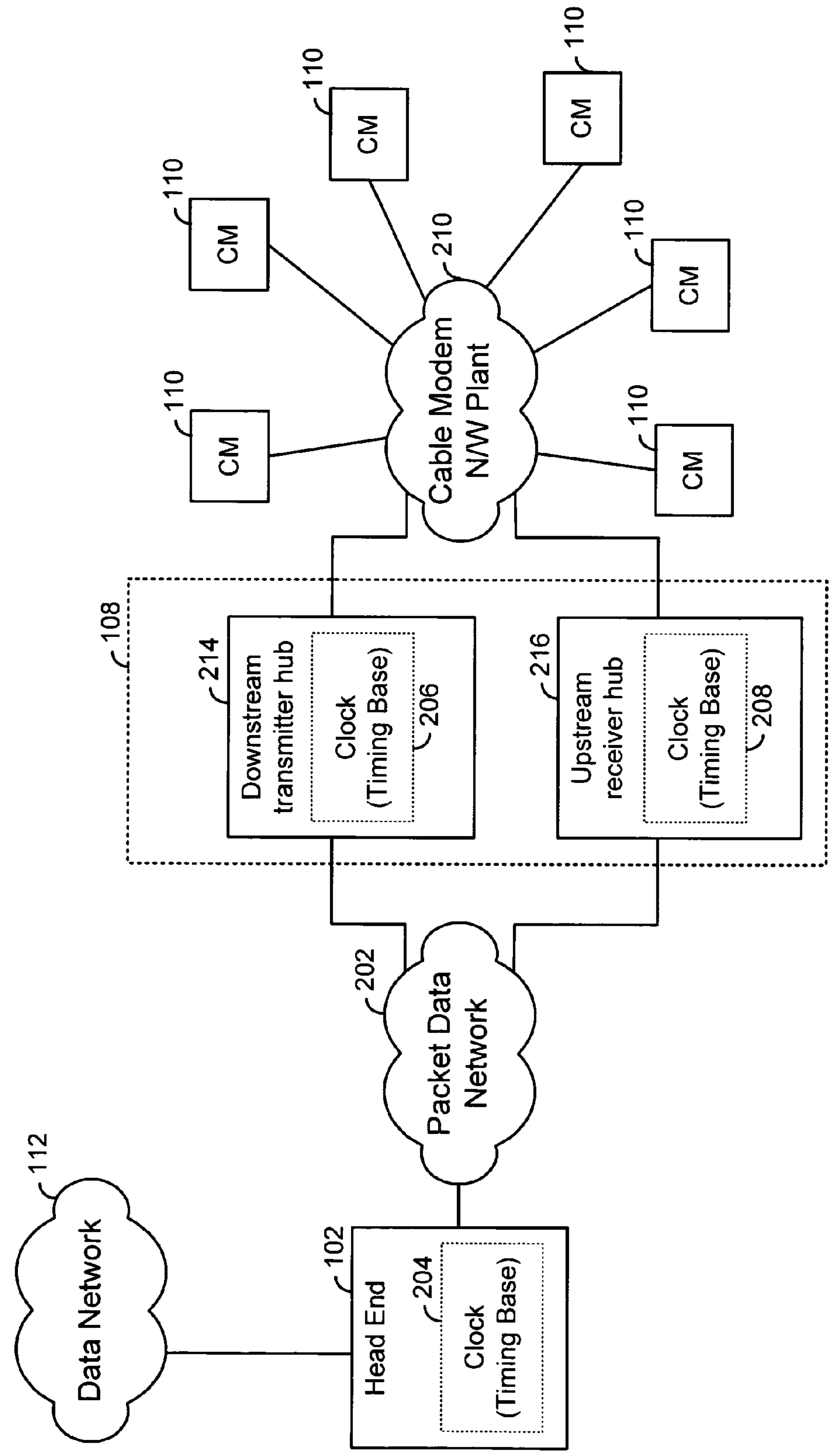
FIG. 2 is a system diagram illustrating a cable modem communication system constructed according to the present invention having distributed CMTS components inter-coupled by a packet switched network.

FIG. 2 is a system diagram illustrating a cable modem communication system constructed according to the present invention having distributed CMTS components inter-coupled by a packet data network 202. A distributed CMTS includes a head end 102 and a hub 108 that includes a downstream transmitter hub 214 and an upstream receiver hub 216. The head end 102, the downstream transmitter hub 214, and the upstream receiver hub 216 couple to one another via the packet data network 202. The packet data network 202 may be an Ethernet network or another type of packet data network. The downstream transmitter hub 214 and the upstream receiver hub 216 of the hub 108 may reside in differing facilities. However, in other embodiment the downstream transmitter hub 214 and the upstream receiver hub 216 may be located in a single facility.

The downstream transmitter hub 214 and the upstream receiver hub 216 couple to cable modem network plant 210. CMs 110 also couple to cable modem network plant 210. The cable modem network plant 210 may be a hybrid fiber coaxial cable modem network 210 or another type of cable modem network plant that's generally known. The distributed CMTS services data communications between data network 112 and CMs 110 via the cable modem network plant 210.

The distributed CMTS operates according to the DOCSIS specification, in some embodiments. As was discussed above, the DOCSIS MAC uses TDMA, FDMA, and/or S-CDMA to service data communications with the CMs 110 across the cable modem network plant 210. Thus, according to these specifications, it is desirable for the head end 102 to be substantially in synchronization with the downstream transmitter hub 214 and the upstream receiver hub 216 from a packet data flow perspective. The downstream transmitter hub 214 includes a clock (timing base) 206. The upstream receiver hub includes clock (timing base) 208. The clocks (timing bases) 206, and 208 of the downstream transmitter hub 214 and the upstream receiver hub 216, respectively, should be sufficiently synchronized to satisfy the timing requirements of the DOCSIS specification. Thus, according to the present invention, the clocks 206 and 208 of the distributed CMTS components are sufficiently synchronized so that the timing requirements of the DOCSIS standards are met. The terms "clocks" and "timing bases" are used interchangeably herein when referring to mechanisms within the downstream transmitter hub 214 and the upstream receiver hub 216 for keeping a system time or other time reference.

The packet data network 202 has a limited ability to distribute accurate timing information due to its inherent jitter. The head end 102 may include a clock (timing base) 204. One possibility for maintaining system time in the distributed CMTS structure of FIG. 2 is to transfer timing information from the head end 102 to the downstream transmitter hub 214 and the upstream receiver hub 216 over the packet data network 202 using time stamps. The downstream transmitter hub 214 and the upstream receiver hub 216 would smooth the jitter caused by the packet data network 202 and recover the timing base clock from the timestamps, typically employing a filter to smooth the time stamps. In order to consider whether the structure of FIG. 2 can support such operations, an analysis may assume the following typical parameters:

1. The packet data network 202 supports Gigabit Ethernet operations.
2. Jitter on a Gigabit Ethernet link=1 ms.
3. After smoothing, timestamp jitter=100 ns, in order to meet overall budget of 500 ns.
4. Timestamp messages are sent at a rate of 100 per second.

The smoothing that would be necessary is the ratio 1 ms/100 ns=$1\times10^4$. Assuming independent jitter on each timestamp, N=$1\times10^8$ timestamps may have to be averaged to achieve smoothing of $1\times10^4$. This would require a smoothing time constant of $1\times10^8$ sec/100=$1\times10^6$ sec, or 11.6 days, which is impractical. In order to use the packet data network 202 to distribute timing information, the packet data network would have to have a jitter limit of approximately 17 us, which is not currently feasible.

Thus, according to the present invention, other techniques are employed to synchronize the components of the distributed CMTS. According to a first aspect of the present invention, packet data flow from the head end 102 to the downstream transmitter hub 214 is substantially synchronized in an attempt to avoid overflow and underflow of a transmit buffer of the downstream transmitter hub 214. These operations will be described with reference to FIG. 6. Alternately, packet data flow from the head end 102 to the downstream transmitter hub 214 may be substantially synchronize using a control loop within the downstream transmitter hub 214 stimulated by time stamps transmitted from the head end 102. These operations will be described further with reference to FIG. 5.

In order to complete synchronization of the distributed CMTS components, the clocks 206 and 208 of the downstream transmitter hub 214 and the upstream receiver hub 216, respectively, are substantially synchronized. Using a first technique according to the present invention, such synchronization is performed using ranging operations supported by at least one cable modem communicatively coupled to both the upstream receiver hub 216 and the downstream transmitter hub 214 via cable modem network plant 210. These operations are described further with reference to FIGS. 3 thru 4. Another technique for synchronizing the clock 208 of the upstream receiver hub 216 to the clock 206 of the downstream transmitter hub includes detecting clock drift based upon changes in alignment of symbols received by the upstream receiver hub 216 when supporting S-CDMA operations. This technique will be described further with reference to FIG. 7.

According to another embodiment of the present invention, the head end 102 transmits a plurality of data packets to the downstream transmitter 214 via the coupling packet data network 202. Each data packet is marked with a "measured delay" Quality of Service (QOS). Each data packet includes a time stamp that is based upon a clock of the head end and a delay tag.

Operation continues with the downstream transmitter hub 214 receiving the plurality of data packets via the packet data network 202. Then, the downstream transmitter hub 214 smoothes the time stamps of the plurality of data packets based upon corresponding delay tags of the data packets. The delay tag of each data packet that is received by the downstream transmitter hub 214 is representative of a corresponding delay encountered in traversing the packet data network 202. Thus, the delay tag represents a delay introduced by the packet data network 202 for the particular data packet. The smoothing of the plurality of time stamps by the downstream transmitter hub 214 may include the downstream transmitter hub 214 first adjusting the time stamps based upon the corresponding delay tags. Then, based upon the smoothed time stamps, the downstream transmitter hub 214 synchronizes its clock 206 with the clock 204 of the head end 102.

Finally, operation concludes with synchronizing a clock 208 of the upstream receiver hub 216 with the clock 206 of the downstream transmitter hub 214. In synchronizing the clock 208 of the upstream receiver hub 216 with the clock 206 of the downstream transmitter hub 214, ranging operations supported by at least one cable modem 110 may be employed. Alternately, a direct connection between the downstream transmitter hub 214 and the upstream receiver hub 216 may be employed. These operations will be described further with reference to FIGS. 8-10.

According to an alternate embodiment of the present invention, the data packets that include the measured delay QOS marking, the time stamp, and the delay tags are transmitted from the head end 102 to the upstream receiver hub 216. In such case, the upstream receiver hub 216 performs smoothing operations of the time stamps to synchronize its clock 208 to the clock 206 of the head end 102. Then, the clock 206 of the downstream transmitter hub 214 is synchronized to the clock 208 of the upstream receiver hub 216. The previously described operations may be employed with this embodiment as well for such clock synchronization. These operations will also be described further with reference to FIGS. 8-10.

Figure 3:
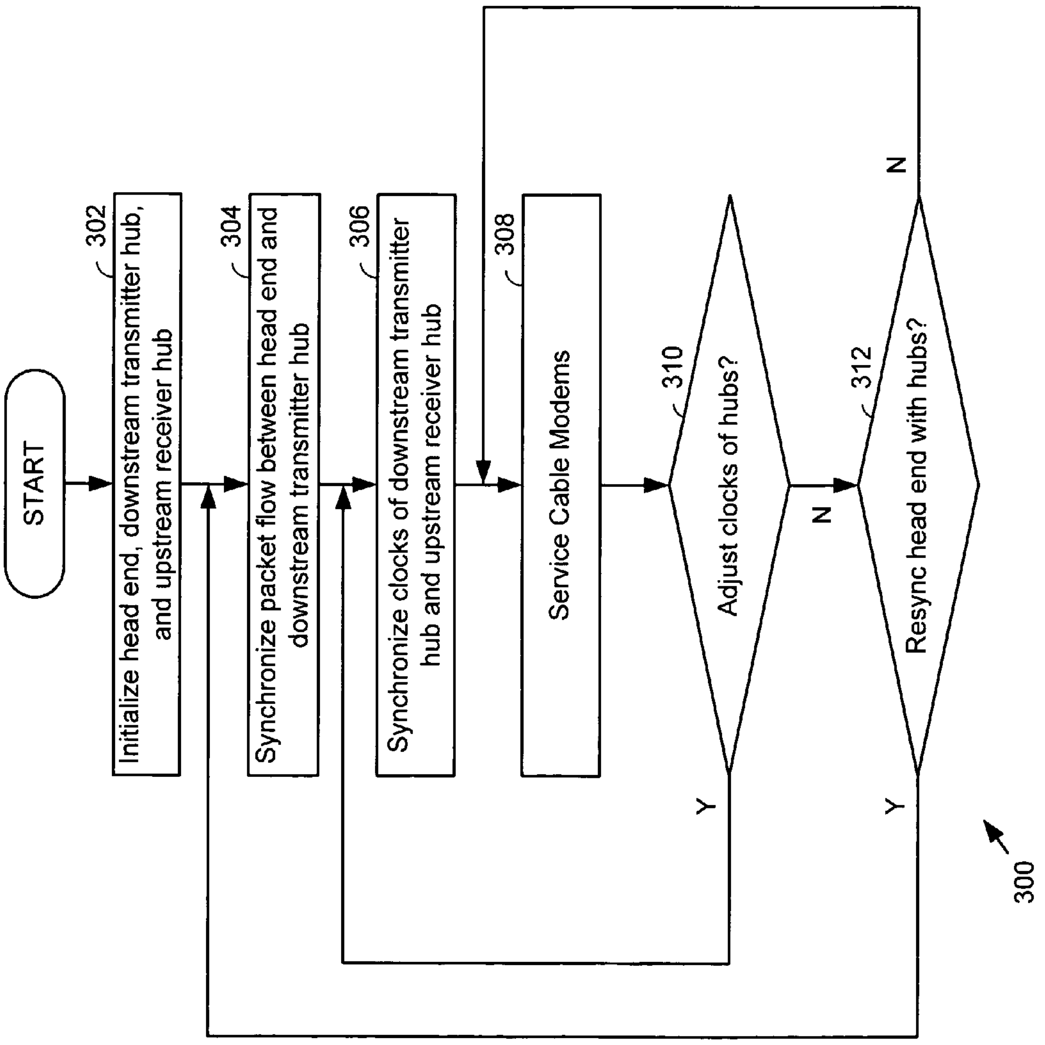
FIG. 3 is a flow chart illustrating operation according to an embodiment of the present invention.

FIG. 3 is a flow chart illustrating operation according to an embodiment of the present invention. Operation commences in initializing the head end 102, the downstream transmitter hub 214, and the upstream receiver hub 216 for operation (step 302). With this step complete, operation continues in establishing packet flow synchronization between the head end 102 and the downstream transmitter hub 214 (step 304). Techniques for performing packet flow synchronization are described further with reference to FIGS. 5 and 6. These operations may further be described herein as regulating packet data flow from the head end 102 to the downstream transmitter hub 214.

Operation continues with synchronizing the clock 206 of the downstream transmitter hub 214 and the clock 208 of upstream receiver hub 216 (step 306). According to the present invention, synchronizing the clock 208 of the upstream receiver hub 216 with the clock 206 of the downstream transmitter hub 206 is performed using ranging operations supported by at least one CM 110 coupled to both the upstream receiver hub 216 and to the downstream transmitter hub 214 via the cable modem network plant 210.

According to one embodiment of step 306, the ranging operations are supported by a plurality of CMs 110 for which the head end 102, the downstream transmitter hub 214, and the upstream receiver hub 216 together provide data service. Normally, ranging is done every 15 seconds or so for each CM 110, so tens to hundreds of time-of-arrival measurements are made each second. With another embodiment, the ranging operations are supported by a dedicated clock synchronization CM. The dedicated clock synchronization CM may be ranged at a high rate, perhaps 10 to 100 times per second. These additional ranging measurements, when smoothed (in a control loop with a slow time constant, say one second or several seconds), give a high confidence in the estimation of the timing drift between the clock 206 of the downstream transmitter hub 214 and the clock 208 of the upstream receiver hub 216. However, since the delay of the cable plant is assumed not to be changing quickly and the frequencies of the clocks should not be changing except due to explicit and intentional changes plus natural clock drift, it should not be necessary to combine very large numbers of measurements to obtain a timing estimate with sufficient accuracy and confidence. Of course, combinations of these embodiments may be employed using both normal ranging information and measurements of one or more dedicated clock synchronization CMs. In either case, the ranging operations are employed to synchronize the clocks 206 and 208 of the downstream transmitter hub 214 and the upstream receiver hub 216, respectively. Also, data bursts may be used in addition to ranging bursts to glean additional information; if data bursts arrive early or late at the receiver hub, that can help define a trend, which implies a frequency offset in the reference clocks, which can then be trimmed out.

Operation of FIG. 3 continues in servicing the CMs, according to one or more aspects of the DOCSIS specification (step 308). The operations of step 308 continue until it is determined that adjustment of the clock 206 of the downstream transmitter hub 214 and/or of the clock 208 of the upstream receiver hub is required (step 310). When adjustment of the clocks 206 and 208 of the downstream transmitter hub 214 and of the upstream receiver hub 216, respectively (as determined at step 310) is/are required, operation returns to step 306. Otherwise, operation proceeds to step 312 where it is determined whether adjustment of the packet flow synchronization of the head end 102 with the downstream transmitter hub 214 is required. If so operation returns from step 312 to step 304. If not, operation proceeds from step 312 to step 308 where service of the CM continues.

As the reader will appreciate, the operations of FIG. 3 may be performed in varying orders that may differ from the order of operations presented in FIG. 3. Synchronization of the clocks 206 and 204 of the downstream transmitter hub 214 and the head end 102, respectively, may occur during the packet flow synchronization of the head end with the downstream transmitter hub 214 and/or during the time period the CMs are serviced. Typically, maintaining synchronization, both packet flow synchronization and clock synchronization is ongoing and may be performed at any time.

Figure 4:
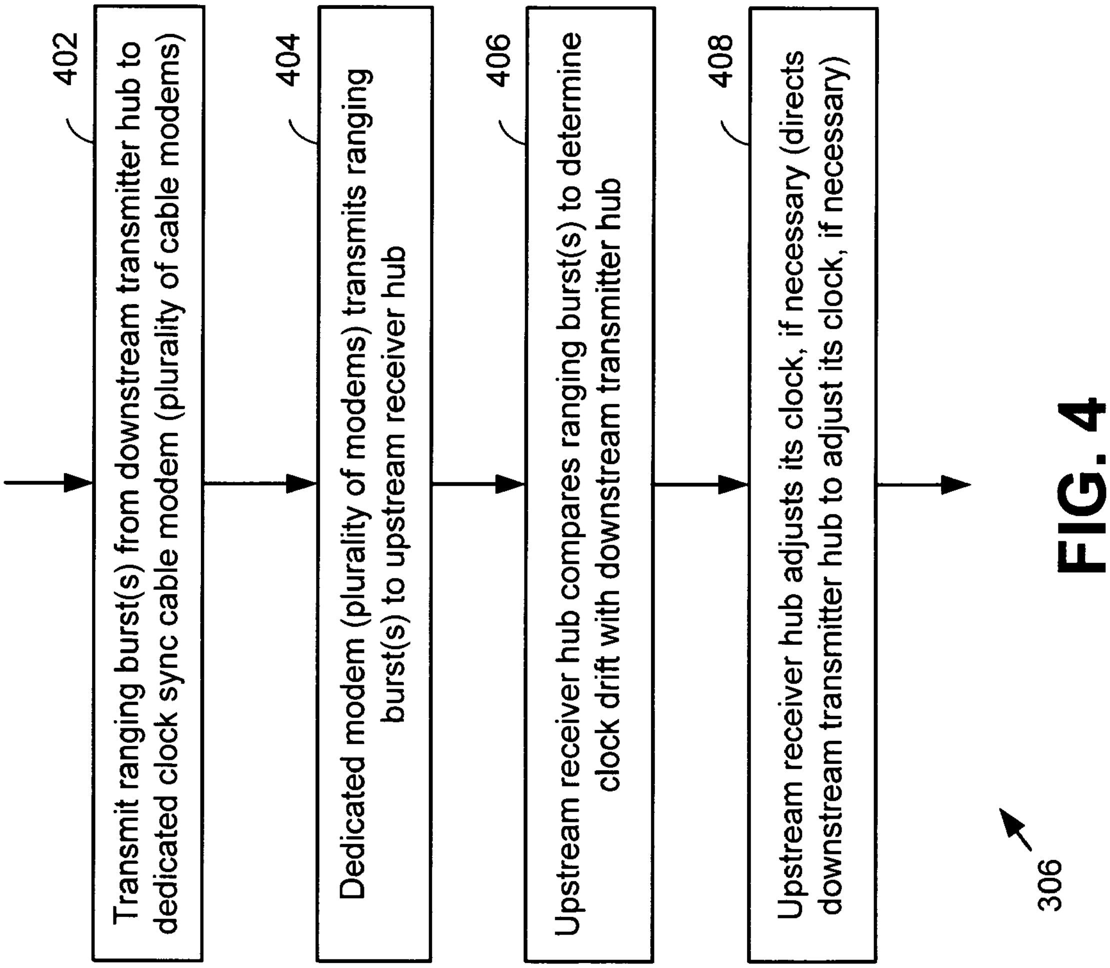
FIG. 4 is a flow chart illustrating a first embodiment of the present invention for synchronizing clocks of a downstream transmitter hub and an upstream receiver hub.

FIG. 4 is a flow chart illustrating a first embodiment of the present invention for synchronizing clocks of a downstream transmitter hub and an upstream receiver hub (step 306 of FIG. 3). Operation commences by transmitting ranging bursts from the downstream transmitter hub 214 to a dedicated clock synchronization CM or to one or a plurality of CMs (step 402). The dedicated clock synchronization CM or the one or a plurality of CMs receive the ranging bursts from the downstream transmitter hub 214, process the ranging bursts, and transmit the ranging bursts to the upstream receiver hub 216 (step 404). The upstream receiver hub 216 receives the ranging bursts and analyzes the ranging bursts to estimate the clock frequency difference between its clock 208 and the clock 206 of the downstream transmitter hub 214 (step 406). The clock drift may manifest itself over time such that adjustments of the upstream receiver hub 216 clock 208 or the downstream transmitter hub 214 clock 206 may be performed at a regular interval, at a non-regular interval, or when the drift exceeds a threshold. Thus, the upstream receiver hub 216 adjusts its clock 208 if necessary or alternatively directs the downstream transmitter hub 214 to adjust its clock 206, if necessary (step 408).

Figure 5:
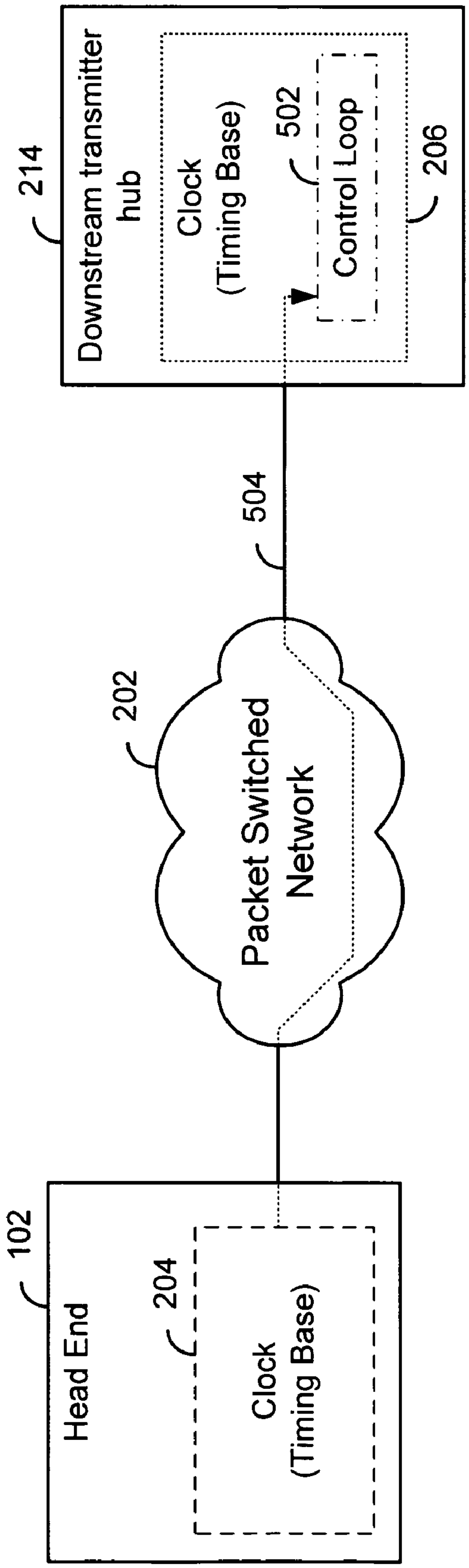
FIG. 5 is a block diagram illustrating an embodiment of the present invention for establishing packet flow synchronization between a head end and a downstream transmitter hub.

FIG. 5 is a block diagram illustrating an embodiment of the present invention for establishing packet flow synchronization between a head end and a downstream transmitter hub. Shown in FIG. 5 are the head end 102, the clock 204 of the head end 102, the downstream transmitter hub 214, the clock 206 of the downstream transmitter hub 214, and the packet data network 202. According to the embodiment of step 304 of FIG. 3 a control loop 502 may be employed to establish packet flow synchronization between the head end 102 and the downstream transmitter hub 214. In such embodiment, the control loop 502 is associated with the downstream transmitter hub 206 and is responsive to timing information (time stamps 504) of the head end 102 clock 204 received across the packet data network 202. Control loops are generally known and will not be described further herein except as how they relate to the present invention. Because the packet data network 202 is jittery, the control loop 502 may be employed to synchronize the head end clock 204 with the downstream transmitter hub clock 214 over time with adequate precision for some supported operations, e.g., 100 ns required for TDMA operation. The latency introduced by the control loop 502 may be excessive for some applications. Further, the time to lock the control loop 502 may be excessive for some applications. Thus, while the control loop 502 is not sufficient to synchronize the head end clock 204 with the downstream transmitter hub clock 206 in all cases, the control loop 502 is typically sufficient to establish packet flow synchronization between the head end 102 and the downstream transmitter hub 214.

Using the control loop 502, the head end 102 transmits time stamps (TS) 504 with packet data. The TS 504 indicate instantaneous values of the clock (time base) 204 of the head end 102, the time base being driven by the clock 204. The control loop 502 of the downstream transmitter hub 214 compares the values of TS 504 at the time they are received with the transmitter hub's 214 own clock (timing base) 206. The downstream transmitter hub 214 clock (timing base) 206 may be initialized to the value of the first TS 504 when the first TS 504 is received, and subsequently operated in a closed loop with the clock (timing base) 204 of the head end 102 by comparing subsequent TS 504 with the timing base 206. The result of the comparison between a received TS 504 and the timing base 206 can be filtered and scaled to give desired loop performance characteristics. Typically the filter is a form of low pass filter, either an FIR filter or IIR filter. The filter may resemble an integrator, although the filter response may be somewhat different from a pure integrator (another zero and pole) in order to ensure loop stability. The scaling of the filter result, i.e. multiplication by a constant, can control the loop gain. Such loops can be designed for high gain i.e. quick response or low gain i.e. slow response. The loop can be designed for variable gain i.e. variable response, so as to achieve lock with the head end 102 clock 204 frequency quickly using high gain and also to achieve very low variations in transmitter hub 214 clock frequency once locked has been achieved, or partially achieved. There can be any number of gain settings. Loop design, gain settings, locks detection, etc. are well known in PLL design.

Figure 6:
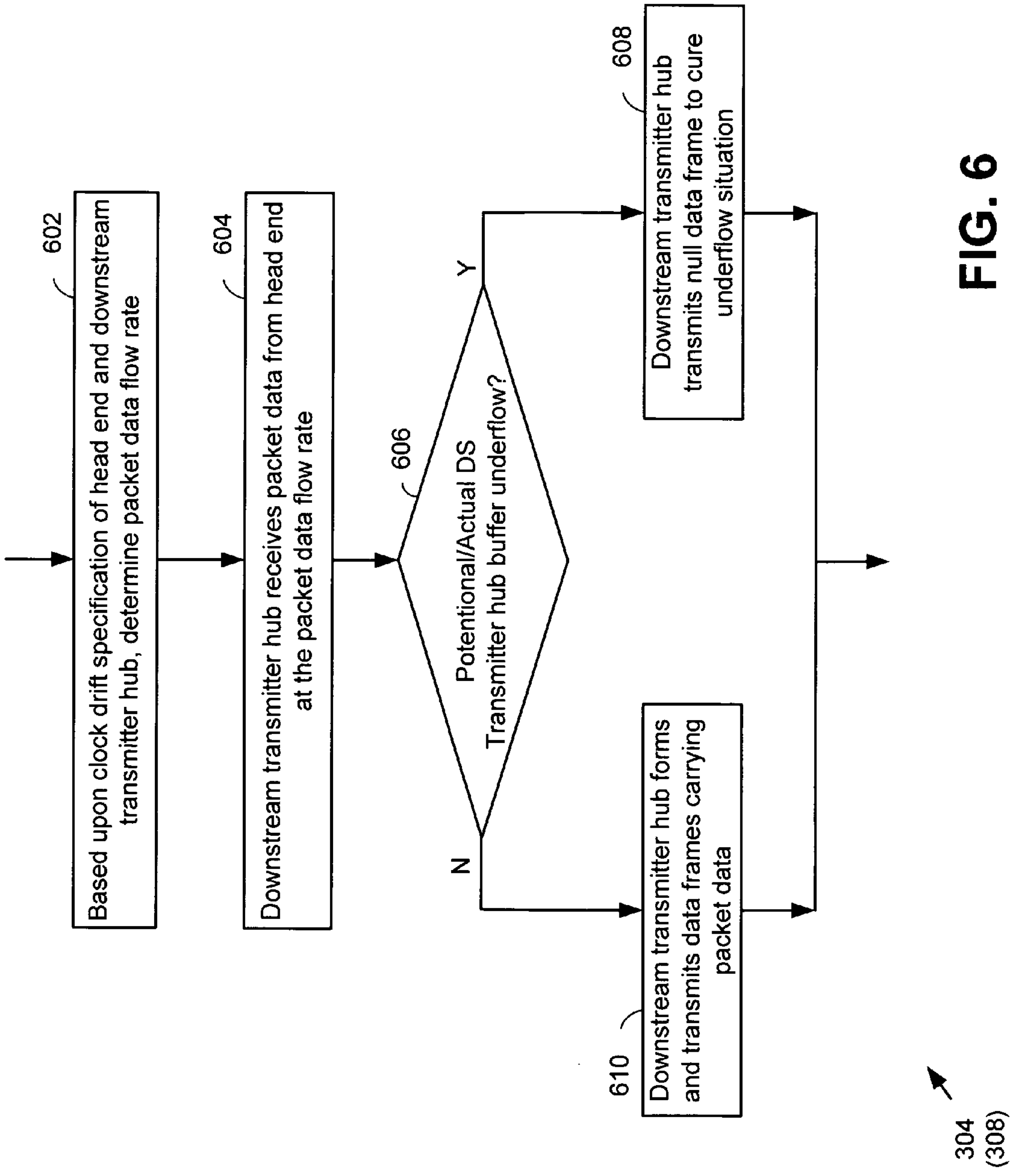
FIG. 6 is a flow chart illustrating another embodiment establishing packet flow synchronization between a head end and an upstream receiver hub according to the present invention.

FIG. 6 is a flow chart illustrating another embodiment for establishing packet flow synchronization between a head end and an upstream receiver hub according to the present invention. The operations of FIG. 6 correspond to steps 304 and 308 of FIG. 3. Operation commences with, based upon clock frequency difference specifications of the head end 102 and of the downstream transmitter hub 214, determining a packet data flow rate that should prevent overflow of a transmit buffer of the downstream transmitter hub 214 (step 602). The operations of step 602 would typically be performed in a design process and be later implemented. Operation continues with the head end 102 transmitting packet data from the head end at a rate that that do not exceed the packet data flow rate (step 604). The downstream transmitter hub 214 receives the packet data, forms the packet data into data frames, and transmits the data frames to the CMs 110 according to the DOCSIS specification, for example. At some time, if the downstream transmitter hub 214 may be transmitting packet data at a greater rate than it is receiving packet data from the head end 102, downstream transmitter hub 214 transmit buffer underflow may occur. Thus, at step 606 the downstream transmitter hub 214 determines whether a downstream transmitter hub 214 transmit buffer underflow has occurred or is about to occur, i.e. if the transmit buffer becomes empty. If a downstream transmitter hub buffer becomes empty, or if it is about to go empty, the downstream transmitter hub transmits one or more null data frames to cure the underflow situation (step 608), i.e. until there is sufficient data in the transmit buffer to enable resumption of transmission of data. However, during normal operations with the head end 102 substantially synchronized with the downstream transmitter hub 214 on a packet flow basis, the downstream transmitter hub 214 forms and transmits data frames carrying packet data to serviced CMs without insertion of null frames (step 610).

The relationship of the data rate demand from the head end 102 to the downstream transmitter hub 214 data rate, and the prevalence of null packets are design variables with multiple solutions. In scenarios where the network delay (between the head end 102 and the downstream transmitter hub 214) is bounded to a known upper limit, the head end 102 data rate can be almost equal to the downstream transmitter hub 214 rate, with the required difference being determined by the maximum difference between the clock rates of the head end 102 and the downstream transmitter hub 214. If for example each clock has a worst case tolerance of 5 ppm, then the total worst case difference is 10 ppm, and in this case the head end 102 should limit its bandwidth demand to 1-10 ppm=0.9999 of the nominal transmitter hub 214 data rate, to cover the case where the head end 102 is at the max frequency and the downstream transmitter hub 214 is at the minimum frequency. Assuming a data rate of 38 Mbps and that a null data frame consists of 188 byte (1504 bit) data packets, for example, the downstream transmitter hub 214 would insert null data frames at a rate of 10 ppm*38 Mbps/1504 bits/packet ~=0.25 data frames/second or about one null data frame per 4 seconds. Of course, this rate depends on the actual relative frequencies of the head end and hub and is not independent of that relationship. In a case where the head end 102 is operating at a minimum specified frequency and the transmitter hub 214 is operating at a maximum specified frequency, the rate of inserted null data frames is doubled to about 0.5 packets/second. If the head end 102 is operating at maximum specified frequency and the transmitter hub 214 is operating at a minimum specified frequency, the same rate of about 0.5 packets/second of null data frame insertion results.

There are various ways for the downstream transmitter hub 214 to determine when to insert null data frames. In one approach, the downstream transmitter hub 214 receives data packets from the head end 102, frames it, and transmits it as soon as possible. Whenever the transmitter hub 214 does not have enough data in its input buffer to be able to form a complete data frame, it sends a null data frame. In such a design, the delay of data traversing the receive buffer trends towards zero. The delay can increase when the network delay changes from a relatively long delay to a relatively short delay. As long as the downstream transmitter hub 214 data rate is greater than the head end 102 data rate, the transmitter hub 214 will normally remove data from the buffer faster than data enters the buffer, and so the buffer fullness tends towards zero over the long term.

If there are multiple classes of data such that some data requires a shorter delay or more predictable delay, data can be transmitted from the head end 102 to the downstream transmitter hub 214 with such classifications indicated. The downstream transmitter hub 214 can prioritize the transmission of data according to the classification of data type, e.g. transmitting higher priority data in its buffer before transmitting lower priority data. This minimizes the additional delay imposed by the buffer on the more delay-sensitive data.

Figure 7:
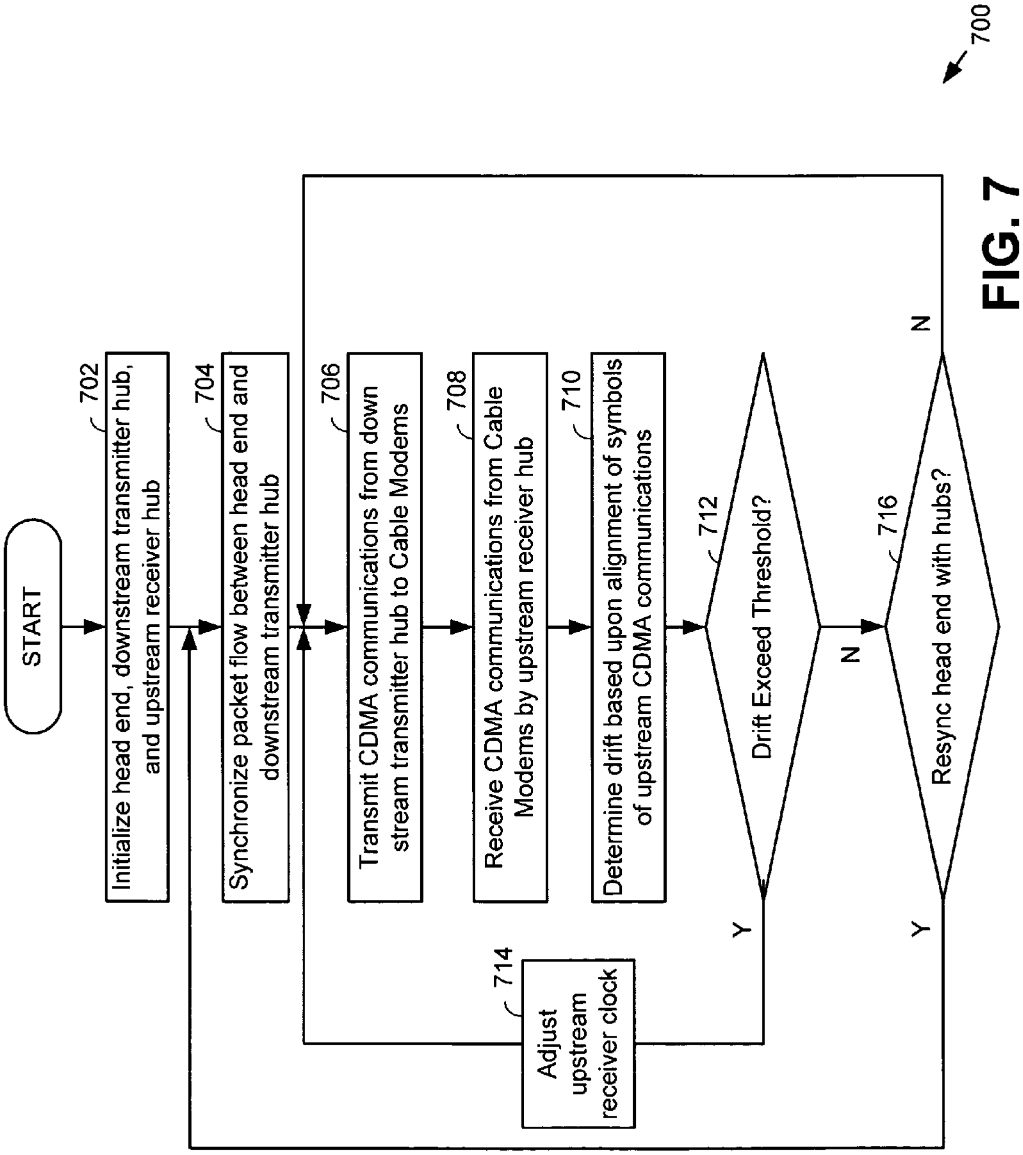
FIG. 7 is a flow chart illustrating operation according to another embodiment of the present invention for synchronizing CMTS components.

FIG. 7 is a flow chart illustrating operation according to another embodiment of the present invention for synchronizing CMTS components. Operation commences in initializing the head end 102, the downstream transmitter hub 214, and the upstream receiver hub 216 for operation (step 702). With this step complete, operation continues in establishing packet flow synchronization between the head end 102 and the downstream transmitter hub 214 (step 704). Techniques for performing packet flow synchronization were described with reference to FIGS. 5 and 6. These operations may further be described herein as regulating packet data flow from the head end 102 to the downstream transmitter hub 214.

Operation continues with the downstream transmitter hub 214 transmitting downstream Code Division Multiple Access (CDMA) communications to a plurality of serviced cable modems 110 (step 706), e.g., downstream transmissions. Then, operation proceeds with the upstream receiver hub receiving upstream CDMA communications from the plurality of serviced cable modems (step 708). The upstream receiver hub then determines a drift in alignment, if any, of symbols of the upstream communications received from the plurality of serviced cable modems with respect to a timing base of the upstream receiver hub (step 710). When the drift in alignment exceeds a threshold, as determined at step 712 to indicate that the clock of the upstream receiver hub is no longer substantially aligned with the clock of the downstream transmitter hub, the clock of the upstream receiver clock is adjusted (Step 714). If no adjustment is required, as determined at step 712, operation proceeds to step 716 where it is determined whether adjustment of the packet flow synchronization of the head end 102 with the downstream transmitter hub 214 is required. If so operation returns from step 712 to step 704. If not, operation proceeds from step 712 to step 708 where service of the CM continues. Operation from step 714 also proceeds to step 706. Alternately, operation could proceed from step 714 to step 716.

As the reader will appreciate, the operations of FIG. 7 may be performed in varying orders that may differ from the order of operations presented in FIG. 7. Typically, maintaining synchronization, both packet flow synchronization and clock synchronization is ongoing and may be performed at any time.

Figure 8:
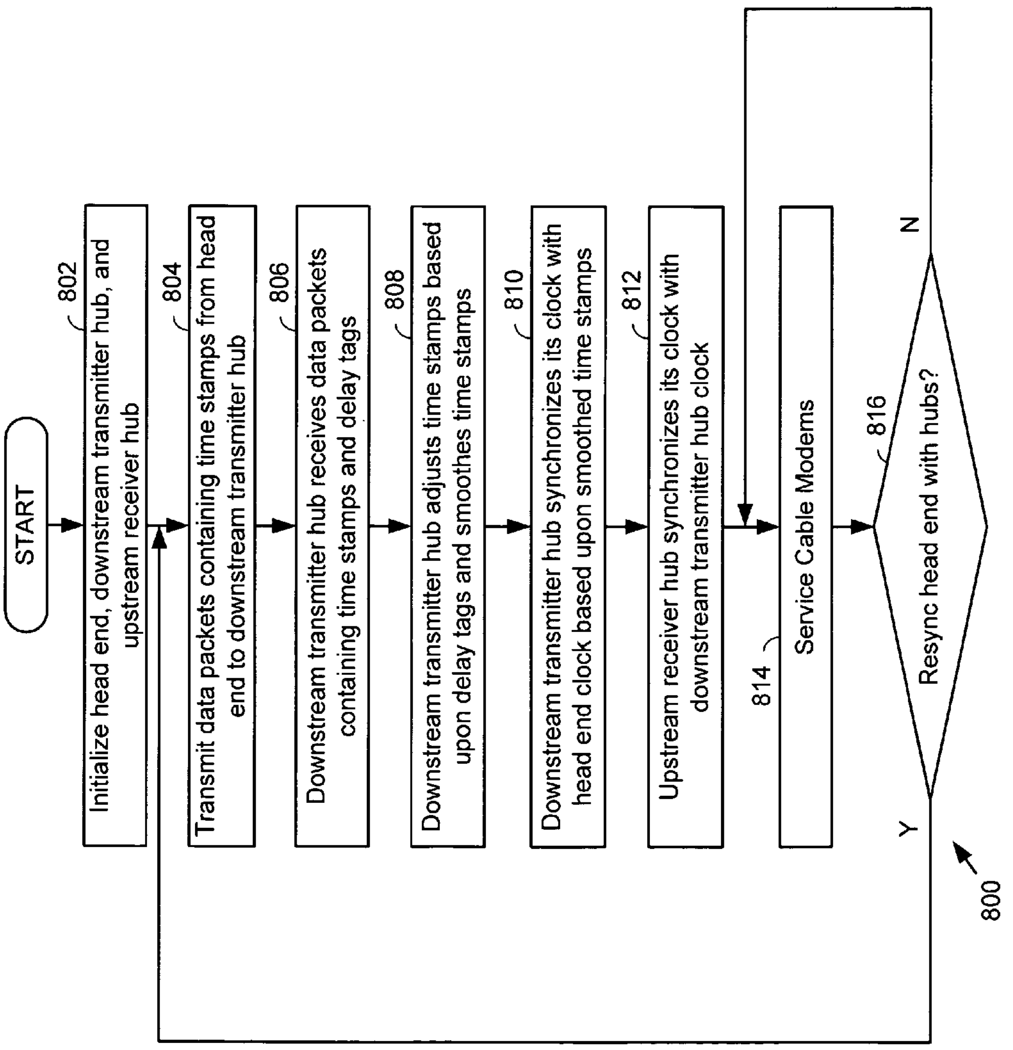
FIG. 8 is a flow chart illustrating operation according to still another embodiment of the present invention for synchronizing distributed CMTS components.

FIG. 8 is a flow chart illustrating operation according to still another embodiment of the present invention for synchronizing distributed CMTS components. Operation 800 commences with the initialization of the head end, the downstream transmitter hub, and the upstream receiver hub of the distributed CMTS (Step 802). Operation continues with the head end transmitting a plurality of data packets to the downstream transmitter hub via a packet data network (Step 804). Each data packet is marked with a measured delay Quality of Service (QoS) indicator and includes a time stamp that is based upon a clock of the head end. Each of these data packets also includes a delay tag. Operation continues with the downstream transmitter hub receiving the data packets via the packet data network with delay tags that have been adjusted by the packet data network based upon latency in traversing the packet data network (Step 806). As will be further described with reference to FIGS. 9 and 10, the delay tags are updated by packet data network elements to indicate the delay introduced into the transmission of the data packets as they traverse the packet data network. The downstream transmitter hub adjusts the time stamps of the plurality of data packets based upon corresponding delay tags and then smoothes the time stamps (Step 808).

Operation continues with the downstream transmitter hub synchronizing its clock with the clock of the head end based upon the smoothed time stamps (Step 810). Then, the upstream receiver hub synchronizes its clock with a clock of the downstream transmitter hub (Step 812). Such synchronization may include using ranging operations as is previously described herein. With synchronization complete, the distributed CMTS components to service a plurality of cable modems (Step 814). From time-to-time, or periodically, resynchronization of the distributed CMTS components is required, as determined at Step 816. When such determination is required, operation returns to Step 804. When resynchronization is not required, the operation returns to Step 814. As the reader will appreciate, these synchronization operations may continue without intervening delay during the normal operations of the distributed CMTS. In such case, the head end regularly transmits data packets containing time stamps and delay to the downstream transmitter hub. The downstream transmitter hub periodically, or continually adjusts the time stamps and smoothes them to synchronization its clock with the clock of the head end.

According to still another embodiment of the present invention, the head end transmits data packets containing time stamps and delay tags to the upstream receiver hub. In such case, the operations of FIG. 8 would be employed with the upstream receiver hub receiving the data packets with the time stamps and delay tags. Then, the upstream receiver hub adjusts the time stamps based upon the delay tags and smoothes the time stamps. The upstream receiver hub then synchronizes its clock with the clock of the head end based upon the smoothing. Then, the upstream receiver clock synchronizes the clock of the downstream transmitter hub clock to its clock via interaction with the downstream transmitter hub.

Figure 9:
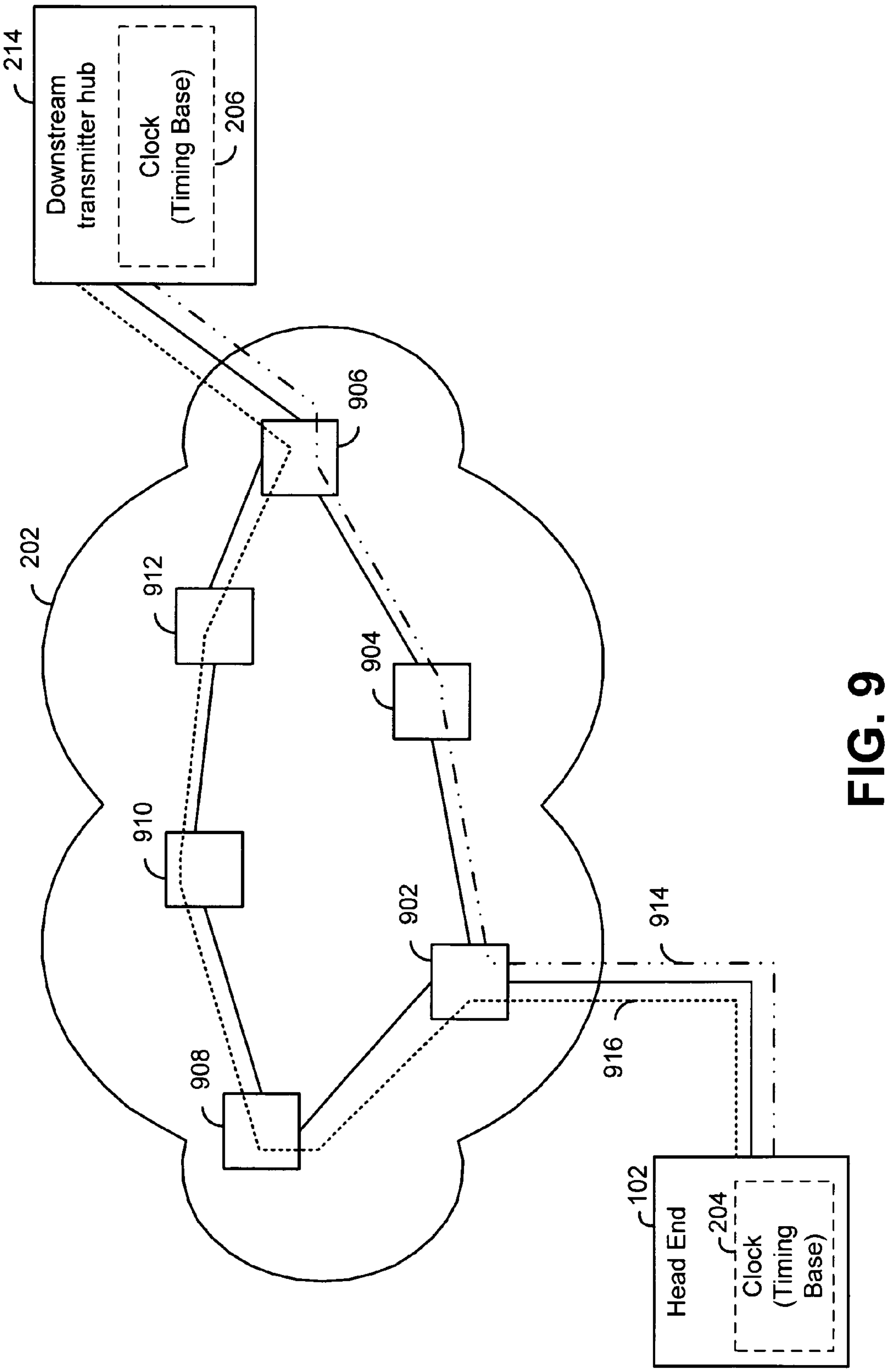
FIG. 9 is a system diagram used to describe operations of packet data network elements according to the present invention.

FIG. 9 is a system diagram used to describe operations of packet data network elements according to the present invention. As shown in FIG. 9, a servicing packet data network 202 includes a plurality of packet data network components 902-912, e.g., switch, router, hub, etc. As is typically the case in a packet data network, data packets traversing the network may take different paths while traversing the packet data network 202. Thus, according to the present invention, the delay tags of the data packets are modified by the packet data network elements to indicate the particular delay incurred by each particular packet data network element in a servicing path. For example, some data packets may traverse the packet data network 202 via path 916 that includes packet data network elements 902, 908, 910, 912, and 906 before reaching the downstream transmitter hub 214. In such case, each of the packet data network elements 902, 908, 910, 912, and 906 adjusts the delay tags of corresponding data packets to indicate the delay introduced by the element.

Comparatively, some data packets transmitted by head end 102 and received by downstream transmitter hub 214 will traverse the packet data network 202 via path 914 that includes packet data network elements 902, 904, and 906. As is shown, data packets traversing paths 916 and 914 will likely have consistently different times of traversal. Thus, according to the present invention, the time stamps contained within these data packets may be adjusted using delay tags. By doing this, the downstream transmitter hub 214 will be able to reduce the overall jitter of the plurality of data packets and more easily synchronize its clock 206 with the clock 204 of the head end 204 using the adjusted time stamps.

For example, a data packet containing a time stack may have to wait in a queue of packet data network element 904 while a larger packet (as large as 1500 bytes, or perhaps even larger if concatenation is used) is processed by the packet data network element 904. The packet data network elements 902-912 are designed so that they record the delay undergone by the data packet containing the time stamp and adjust the delay tag with this information. The packet data network elements 902-912 may use a simple counter to count increments of time (e.g., nanoseconds or picoseconds) while the data packet containing the time stamp is in the queue. As the data packet containing the time stamp moves from packet data network element to packet data network element, it incurs various random delays. Because each delay is measured by the servicing packet data network element, and such delay is added to the delay tag of the data packet, by the time the data packet has reached the final destination, e.g., the downstream transmitter hub 214, the delay tag will have accumulated the sum of all the delays it incurred in traversing the packet data network 202.

The downstream transmitter hub 214 (or upstream receiver hub 216), processes the time stamps taking the delay tag information into account so that it compensates for the random delay through the packet data network 202. One way to take advantage of this delay tag is simply to add the delay tag to the time stamp itself. For example, say the time stamp originally had the value t1. As it traverses the network, it encounters various delays which total t2, which are accumulated in the delay tag. The downstream transmitter hub 214 then computes a corrected time stamp value as t3=t1+t2. Such computation acts to remove the effect of the random jitter from the time stamp. It is as if the time stamp had been emitted from the head end 102 at a later time, t3, and had traversed a packet data network 202 with zero delay, and essentially zero jitter.

Figure 10:
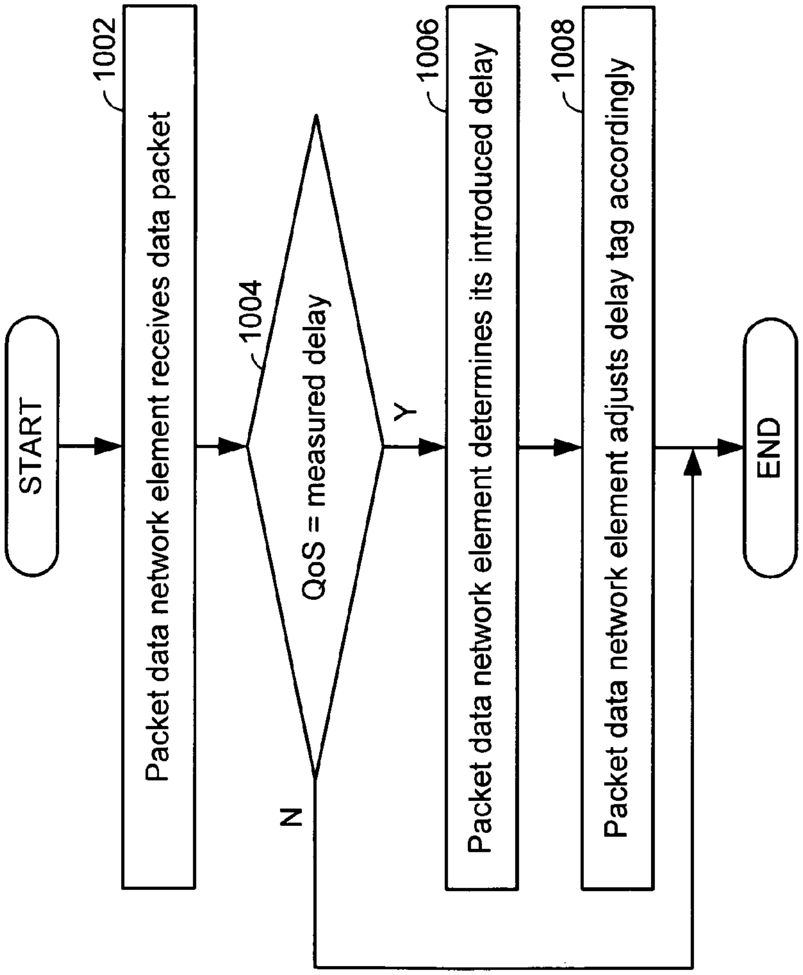
FIG. 10 is a flow chart illustrating operations of packet data network elements according to the present invention.

FIG. 10 is a flow chart illustrating operations of packet data network elements according to the present invention. Each of the packet data network elements, 902-912 of FIG. 9, for example, may alter the delay tags of data packets having a measured delay QOS indicator. The packet data network element receives a data packet (Step 1002). The packet data network element then looks at the data packet to determine if the QOS for the particular data packet is the measured delay QOS (Step 1004). If the QOS of the data packet is not the measured delay QOS, operation ends. However, if the QOS is the measured delay QOS, operation proceeds to Step 1006 wherein the packet data network element determines the delay it introduces in receiving, servicing and transmitting the data packet. Because the packet data network element may be relatively busy or relatively lightly loaded during any particular time interval, the delay introduced by the packet data network element will vary from time-to-time. Thus, after determining this introduced delay, the packet data network element adjusts the delay tag of the data packet accordingly (Step 1008). The packet data network element then passes the data packet along to a next packet data network element or to the downstream transmitter hub 214 or upstream receiver hub 216. The operations of FIG. 10 apply to both the transmission of data packets from the head end to the downstream transmitter hub and to the transmission of data packets from the head end to the upstream receiver hub.

Figure 11:
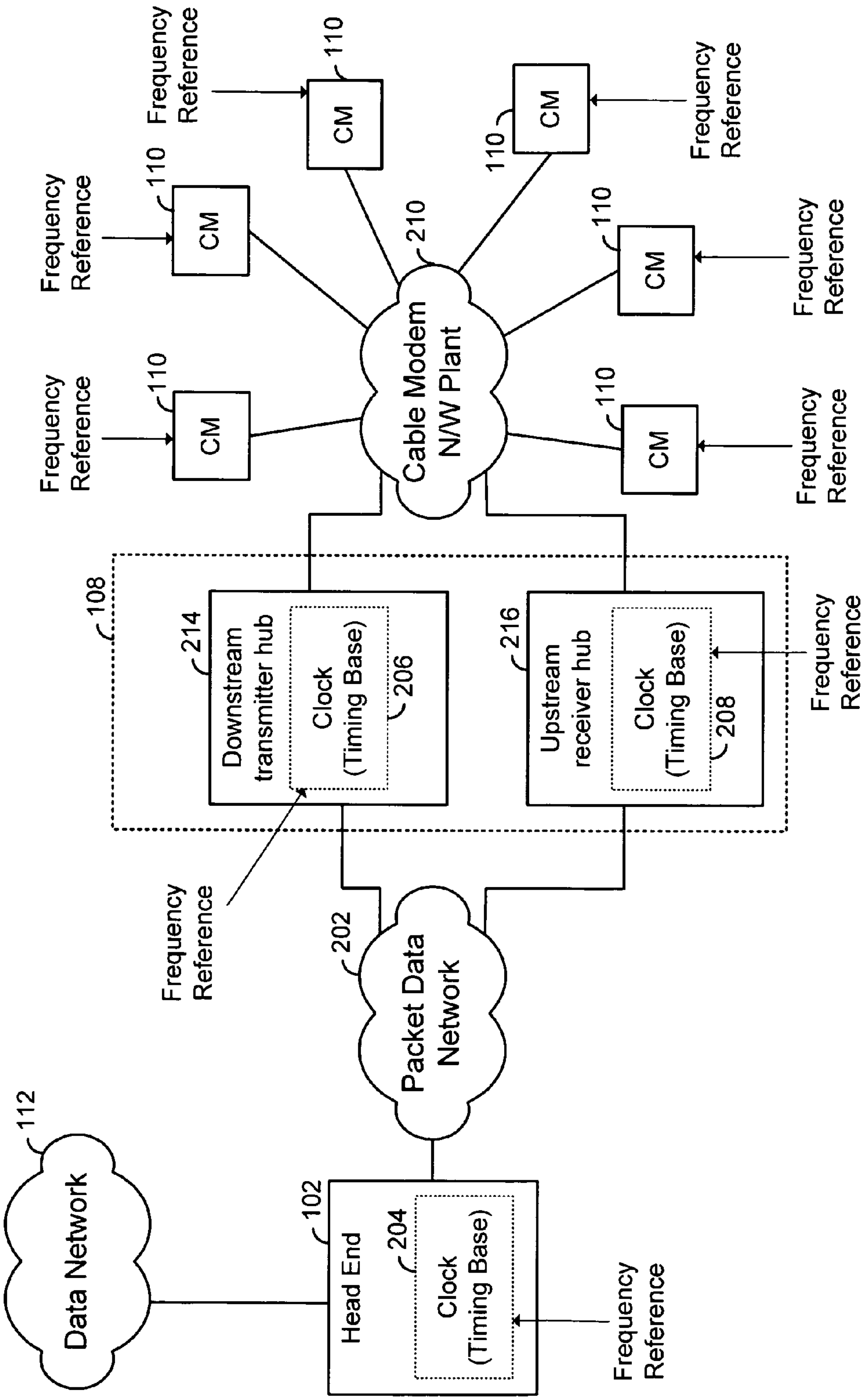
FIG. 11 is a system diagram illustrating a cable modem communication system constructed according to another embodiment of the present invention having distributed CMTS components inter-coupled by a packet switched network.

FIG. 11 is a system diagram illustrating a cable modem communication system constructed according to another embodiment of the present invention having distributed CMTS components inter-coupled by a packet data network 202. The components of FIG. 11 are same/similar to those described with reference to FIG. 2 and common numbering is maintained. As contrasted to the embodiment of FIG. 2, with the embodiment of FIG. 11, a frequency reference is distributed from a server or a reference to the head end 102, to the downstream transmitter hub 108, and to the CMs 110. As an example, the frequency reference may be 10.24 MHz clock, as is specified in DOCSIS. The CMs 110 are each equipped with a PLL which track the frequency reference by establishing frequency lock with the frequency reference. Even after achieving the frequency lock of the frequency reference, respective counters that keep time at the CMs 110 have not yet been synchronized. The operations of FIG. 12 represent one embodiment for performing counter synchronization of the CMTS components while the operations of FIG. 13 represent another embodiment for performing counter synchronization of the CMTS components.

Figure 12:
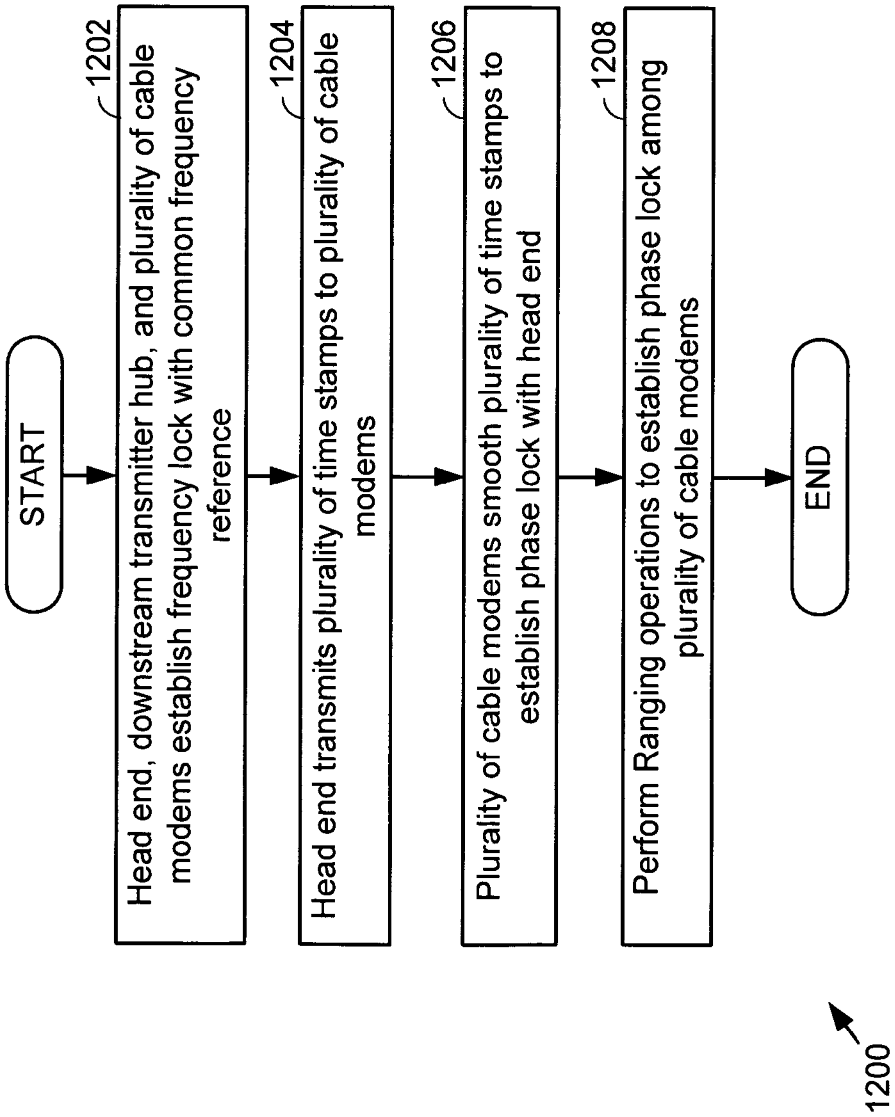
FIG. 12 is a flow chart illustrating distributed CMTS component synchronization operations according to an embodiment of the present invention.
Figure 13:
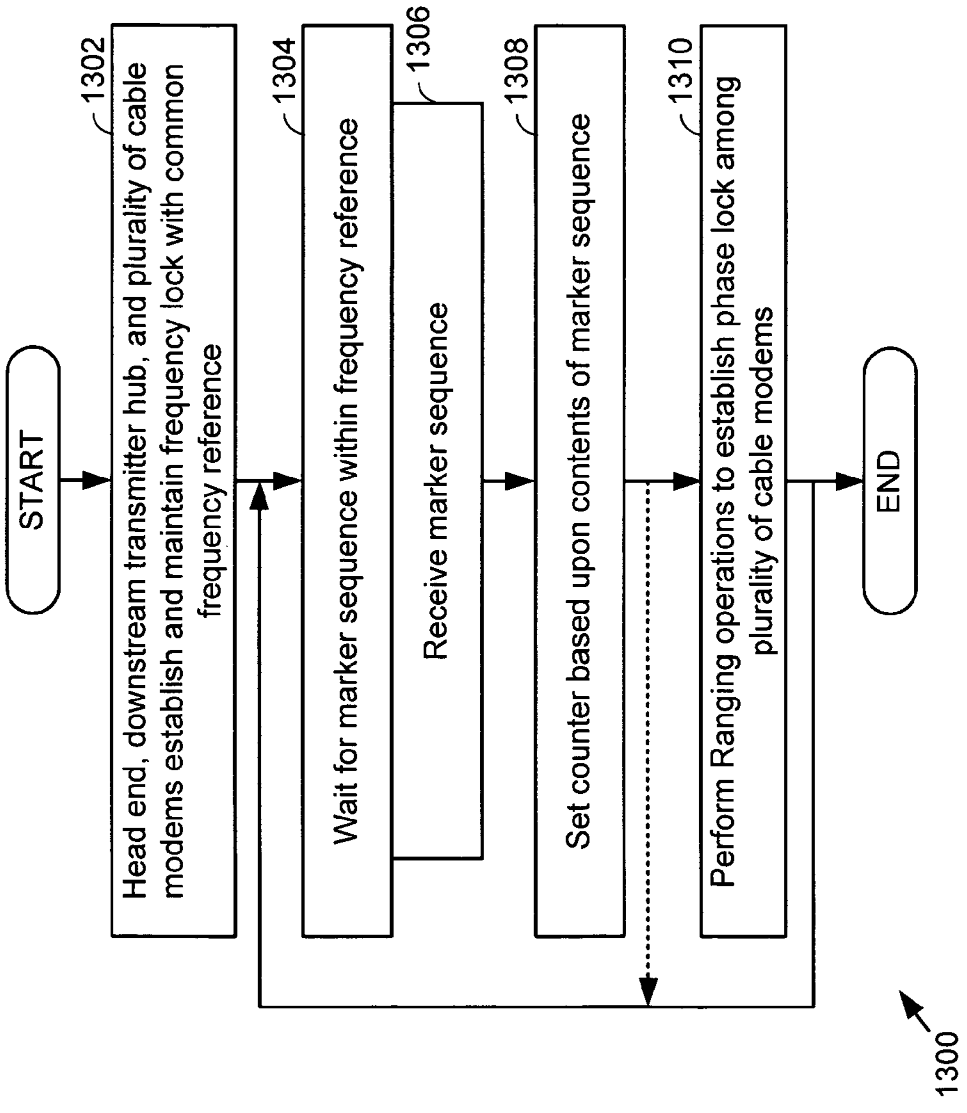
FIG. 13 is a flow chart illustrating distributed CMTS component synchronization operations according to another embodiment of the present invention.

FIG. 12 is a flow chart illustrating distributed CMTS component synchronization operations according to an embodiment of the present invention. Operation 1200 begins with the head end 102, the downstream transmitter hub 108, and the plurality of CMs 110 establishing frequency lock with the common frequency reference (step 1202). Next, operation includes transmitting a plurality of time stamps from the head end 102 to the plurality of CMs 110 via the packet data network, the downstream transmitter hub, and the cable modem network plant 210 (1204). Operation continues with each of the plurality of CMs performing smoothing operations on the plurality of time stamps to establish phase lock with the head end (1206). Finally, operation concludes with performing ranging operations by the downstream transmitter hub 108 and the plurality of CMs 110 to establish phase lock among the plurality of CMs 110 (step 1208). The ranging operations may include adjusting counters of at least some of the plurality of CMs 110.

With the operations 1200 of FIG. 12, the time stamps are distributed to all CMs 110 over the standard packet data network 202, e.g., a Gigabit Ethernet network. In one example, the Gigabit Ethernet network has 1 ms of jitter. When averaging $10^4$ time stamps at each CM 110, each CM 110 can reduce the jitter by sqrt($10^4$)=100 times, assuming independent jitter samples. This reduces the jitter to 1 ms/100=10 μs. After the CMs 110 have completed this smoothing, the CMs 110 load their time counters with the smoothed time stamp value and begin counting from there using the distributed frequency reference. After this has been done by all of the CMs 110, the following situation is in place: (1) all CMs 110 have time counters that are off by 10 μs (1 sigma) from each other, and are incrementing their counters in lock step, using the distributed clock, so that their time offsets from each other remain constant. Thus, the smoothing operations cause the plurality of cable modems to have counter phase offsets from one another.

The ranging operations substantially remove the phase offsets among the plurality of CMs 110 and the system is able to operate normally. The counters of some or all of he CMs 100 may be adjusted to remove the ranging offsets. In any event, the CMTS will compensate for the offsets in the ranging process. We have now succeeded in synchronizing all the CMs 110 using "in-band" time stamps sent over a jittery network, supplemented by a distributed frequency reference. The key idea is that the frequency reference enables all CMs 110 to advance their timing phase in lock step. The only challenge is their initial offsets, which can be solved by in-band time stamp distribution over the jittery packet data network 202, coupled with a reasonable amount of smoothing (100× in this example) by an amount sufficient to enable ranging to occur.

FIG. 13 is a flow chart illustrating distributed CMTS component synchronization operations according to another embodiment of the present invention. Operation 1300 begins with the head end 102, the downstream transmitter hub 108, and the plurality of CMs 110 establishing frequency lock with the common frequency reference (step 1302). Next, operation includes the head end 102, the downstream transmitter hub 108, and the plurality of CMs 110 waiting for marker sequences within the frequency reference (step 1304) and the periodically extracting received marker sequences from the frequency reference (1306). Operation continues with the head end, the downstream transmitter hub, and the plurality of cable modems setting respective counters based upon contents of the marker sequence (1306). Finally, operation concludes with performing ranging operations by the downstream transmitter hub 108 and the plurality of CMs 110 to establish phase lock among the plurality of CMs 110 (step 1308). The ranging operations may include adjusting counters of at least some of the plurality of CMs 110.

With the method 1300 of FIG. 13, a marker sequence occasionally augments the distributed frequency reference. In one particular operation, a 10.24 MHz frequency reference is distributed from a server to multiple clients over fiber or twisted-pair cables. The clock may be a band limited square wave, for example. Regularly, e.g., once per second or similar, the frequency reference is modulated with a short known marker sequence, e.g., a 13-bit Barker sequence, or other preamble-type sequence (length less than or equal to 64 is adequate). The clients (head end 102, downstream transmitter hub 108, and/or CMs 110) are each equipped with PLLs that track the frequency reference. These PLLs are designed with a narrow loop bandwidth and are therefore not adversely affected by the marker sequence. The PLLs may be designed specifically to ignore the marker sequence, for example, by gating their error signals to zero during the time when the marker is expected to be present in the frequency reference. Because of this, the PLLs continue to track the frequency reference as before, with little perturbation from the marker.

The clients are also equipped with marker detection circuitry that detects the presence and time of arrival of the marker sequence. The time of arrival information is used to set and maintain the client's time stamp counter. In this manner, all clients are given not only the frequency reference, but a time reference as well. However, the marker only comes periodically, e.g., every second. Thus, the counters can only be set to proper positions every one second or so, and the clients cannot determine what second it is, or any higher time unit such as seconds, minutes, hours, days, years, etc. Thus, higher time units are sent to the client over a standard network, such as the Gigabit Ethernet. The jitter in the Gigabit Ethernet network is no longer a factor, as long as it is much less than one second, since the fine timing information is provided by the marker, not the Gigabit Ethernet network. We now have a situation where all clients are synchronized by marker pulses. Even after these operations, varying cable lengths of the cable modem network plant 210 between the downstream transmitter hub 108 to each CM 100 causes offsets in the CMs' 110 counter times (approximately 1.5 ns per ft). The ranging operations, e.g., DOCSIS ranging operations compensate for these offsets.

As an enhancement to the operations 1300 of FIG. 13, in addition to the marker sequence, the frequency reference may also include time stamp information, including seconds, minutes, hours, days, years, etc. While these operations may cause more interruption of the PLLs of the CMs 110 to receive this time stamp information, such operations reduce the amount of information that must be sent over the packet data network 202 for time synchronization.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for synchronizing operation of distributed cable modem termination system components, the method comprising:

operating a head end, a downstream transmitter hub, and an upstream receiver hub, each being components within the distributed cable modem termination system components, and also operating a plurality of cable modems for establishing frequency lock with a common frequency reference;

transmitting a plurality of time stamps from the head end to the plurality of cable modems via a packet data network, the downstream transmitter hub, and cable modem network plant;

operating each of the plurality of cable modems for performing smoothing operations on the plurality of time stamps to smooth jitter incurred within the plurality of time stamps during transmission via the packet data network and to establish phase lock with the head end; and cooperatively performing ranging operations by the downstream transmitter hub, the upstream receiver hub, and the plurality of cable modems to establish phase lock among the plurality of cable modems and to synchronize clocks respectively included within each of the downstream transmitter hub the upstream receiver hub, wherein ranging operations as performed by the plurality of cable modems involving processing first ranging bursts received from the downstream transmitter hub and ranging operations as performed by the upstream receiver hub involving processing second ranging bursts received from the plurality of cable modems.

2. The method of claim 1, wherein the ranging operations include adjusting counters of at least some of the plurality of cable modems.

3. The method of claim 1, wherein:

the smoothing operations cause the plurality of cable modems to have phase offsets from one another; and the ranging operations substantially remove the phase offsets among the plurality of cable modems.

4. The method of claim 1, wherein the common frequency reference is a 10.24 MHz clock.

5. The method of claim 4, wherein establishing frequency lock with the common frequency reference comprises locking Phase Locked Loops of the plurality of cable modems to the common frequency reference.

6. A distributed cable modem termination system, comprising:

a head end;

a downstream transmitter hub communicatively coupled to the head end by a packet data network; and an upstream receiver hub communicatively coupled to the head end by the packet data network; and wherein:

a plurality of cable modems being communicatively coupled to the downstream transmitter hub and the upstream receiver hub by cable modem network plant;

the head end, the downstream transmitter hub, the upstream receiver hub, each being components within the distributed cable modem termination system components, and the plurality of cable modems operative to establish frequency lock with a common frequency reference;

the head end transmitting a plurality of time stamps to the plurality of cable modems via a packet data network, the downstream transmitter hub, and cable modem network plant;

each of the plurality of cable modems is operative to performing smoothing operations on the plurality of time stamps to smooth jitter incurred within the plurality of time stamps during transmission via the packet data network and to establish phase lock with the head end;

the plurality of cable modems, the upstream receiver hub, and the downstream transmitter hub are cooperatively operative to perform ranging operations to establish phase lock among the plurality of cable modems and to synchronize clocks respectively included within each of the downstream transmitter hub the upstream receiver hub; and ranging operations as performed by the plurality of cable modems involve the plurality of cable modems processing first ranging bursts received from the downstream transmitter hub; and ranging operations as performed by the upstream receiver hub involving processing second ranging bursts received from the plurality of cable modems.

7. The distributed cable modem termination system of claim 6, wherein the ranging operations include adjusting counters of at least some of the plurality of cable modems.

8. The distributed cable modem termination system of claim 6, wherein:

the smoothing operations cause the plurality of cable modems to have phase offsets from one another; and the ranging operations substantially remove the phase offsets among the plurality of cable modems.

9. The distributed cable modem termination system of claim 6, wherein the common frequency reference is a 10.24 MHz clock .

10. The distributed cable modem termination system of claim 6, wherein each cable modem includes a Phase Locked Loop (PLL), and the cable modems are operative to frequency lock their PLLs with the common frequency reference.

11. A method for synchronizing operation of distributed cable modem termination system components, the method comprising:

operating a head end, a downstream transmitter hub, and an upstream receiver hub, each being components within the distributed cable modem termination system components, and also operating a plurality of cable modems for establishing frequency lock with a common frequency reference;

operating the head end, the downstream transmitter hub, the upstream receiver hub, and the plurality of cable modems for periodically extracting marker sequences from the common frequency reference;

upon receipt of a marker sequence, operating the head end, the downstream transmitter hub, and the plurality of cable modems for setting respective counters based upon contents of the marker sequence; and cooperatively performing ranging operations by the downstream transmitter hub and the plurality of cable modems to establish phase lock among the plurality of cable modems and to synchronize clocks respectively included within each of the downstream transmitter hub the upstream receiver hub, wherein ranging operations as performed by the plurality of cable modems involving processing first ranging bursts received from the downstream transmitter hub and ranging operations as performed by the upstream receiver hub involving processing second ranging bursts received from the plurality of cable modems.

12. The method of claim 11, wherein the ranging operations include adjusting counters of at least some of the plurality of cable modems.

13. The method of claim 11, wherein the marker sequence comprises a Barker sequence.

14. The method of claim 11, wherein the common frequency reference is a 10.24 MHz clock.

15. The method of claim 11, wherein:

establishing frequency lock with the common frequency reference comprises locking Phase Locked Loops (PLLs) of the plurality of cable modems to the common frequency reference; and the PLLs have a narrow bandwidth and do not lose frequency lock with the common frequency reference upon receipt of the marker sequence.

16. The method of claim 11:

wherein establishing frequency lock with the common frequency reference comprises locking Phase Locked Loops (PLLs) of the plurality of cable modems to the common frequency reference; and further comprising gating the PLLs during receipt of the marker sequences.

17. A distributed cable modem termination system comprising:

a head end;

a downstream transmitter hub communicatively coupled to the head end by a packet data network; and an upstream receiver hub communicatively coupled to the head end by the packet data network; and wherein:

a plurality of cable modems being communicatively coupled to the downstream transmitter hub and the upstream receiver hub by cable modem network plant;

the head end, the downstream transmitter hub, the upstream receiver hub, each being components within the distributed cable modem termination system, and the plurality of cable modems operative to establish frequency lock with a common frequency reference;

the head end, the downstream transmitter hub, the upstream receiver hub, and the plurality of cable modems operative to periodically extract marker sequences from the common frequency reference and to set respective counters based upon contents of the marker sequence;

the plurality of cable modems, the upstream receiver hub, and the downstream transmitter hub are cooperatively operative to perform ranging operations to establish phase lock among the plurality of cable modems and to synchronize clocks respectively included within each of the downstream transmitter hub the upstream receiver hub; and ranging operations as performed by the plurality of cable modems involve the plurality of cable modems processing first ranging bursts received from the downstream transmitter hub; and ranging operations as performed by the upstream receiver hub involving processing second ranging bursts received from the plurality of cable modems.

18. The distributed cable modem termination system of claim 17, wherein the ranging operations include adjusting counters of at least some of the plurality of cable modems.

19. The distributed cable modem termination system of claim 17, wherein the marker sequence comprises a Barker sequence.

20. The distributed cable modem termination system of claim 17, wherein the common frequency reference is a 10.24 MHz clock.

21. The distributed cable modem termination system of claim 17, wherein:

establishing frequency lock with the common frequency reference comprises locking Phase Locked Loops (PLLs) of the plurality of cable modems to the common frequency reference; and the PLLs have a narrow bandwidth and do not lose frequency lock with the common frequency reference upon receipt of the marker sequence.

22. The distributed cable modem termination system of claim 17:

wherein establishing frequency lock with the common frequency reference comprises locking Phase Locked Loops (PLLs) of the plurality of cable modems to the common frequency reference; and further comprising gating the PLLs during receipt of the marker sequences.

* * * * *